Oct. 16, 1962  A. S. C. WADSWORTH ET AL  3,058,783

ACCESSORY TRACTION UNITS

Filed March 22, 1961  2 Sheets-Sheet 1

ALEXANDER S. C. WADSWORTH
FRANCIS B. PEACOCK
INVENTORS

BY W Glenn Jones

ATTORNEY

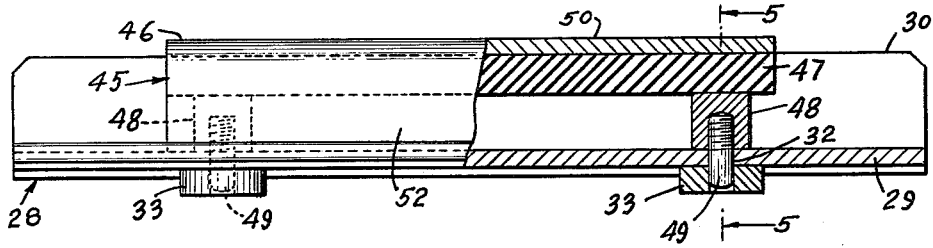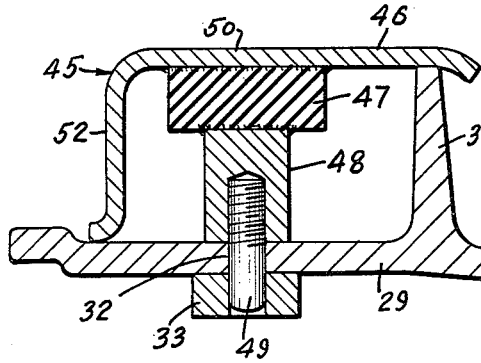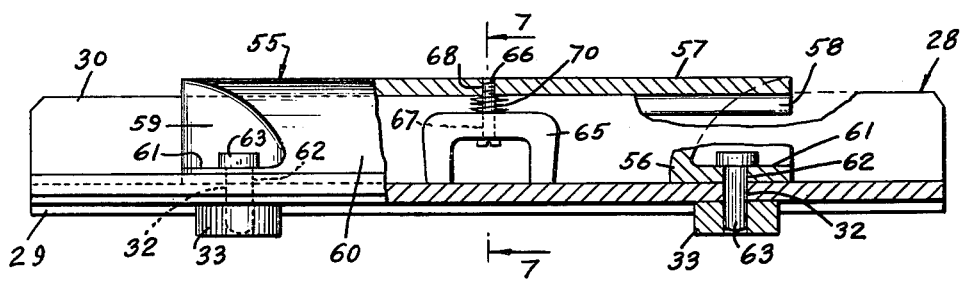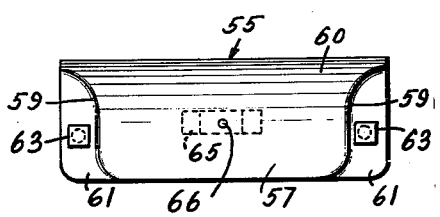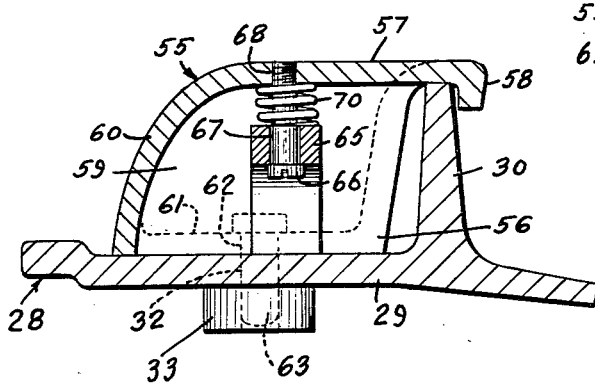

3,058,783
ACCESSORY TRACTION UNITS

Alexander S. C. Wadsworth and Francis B. Peacock, both of U.S. Naval Construction Battalion Center, Gulfport, Miss.
Filed Mar. 22, 1961, Ser. No. 97,707
2 Claims. (Cl. 305—51)
(Granted under Title 35, U.S. Code (1952), sec. 266)

The invention described herein may be manufactured and used by or for the Government of the United States of America for governmental purposes without the payment of any royalties thereon or therefor.

This invention relates generally to improvements in quickly attachable-detachable traction units which are adapted for use in connection with the endless tracks of certain types of tractors. The invention is particularly directed to street plates and traction shoes of elastic materials which may be rapidly installed on the standard track or grouser plates making up the endless track as supplied with the tractor and as rapidly removed therefrom.

The usual endless tracks supplied with such tractors comprise a plurality of grouser plates secured to one or more heavy link endless sprocket chains which turn over power driven sprocket wheels at each end of the machine. The grouser consists of a generally flat plate with an outwardly extending cleat or lug usually formed integrally with the flat plate portion. When the tractor is run over pavement, or particularly stony ground, it is customary to place a street plate or hard rubber shoe on each grouser so as to prevent the grouser cleat or lug from digging into the pavement or floor and also to prevent the cleat from being damaged by the stony ground.

Ordinarily, these street plates and rubber shoes are bolted to each of the grousers, and, as can be readily seen in large tractors, such an operation is time-consuming, tedious, and arduous. Where the tractor is to be moved only a short distance over pavement or rough ground, such an operation becomes expensive and annoying. Where dunnage is used to provide an auxiliary pavement or track over which the grouser cleated tractor moves, the procurement and placing of the dunnage, with its consequent removal, are also inconvenient, time-consuming, and expensive. With our invention, however, the emplacement and removal of street plates or comparatively soft shoes becomes but a matter of minutes resulting in a material saving in time and labor charges.

In such fittings shown in the prior art, which fittings relied on mechanical connection to the grouser, either some modification had to be applied to the grouser for adapting it to the use of such fittings or the grouser had to be carefully cleaned on both sides to install such fittings.

The principal object of our invention is to provide quickly attachable-detachable traction units which may enable a rapid conversion of one form of tractor to another thus saving time, labor, and capital expenditure for a considerable number of special purpose tractors.

Further objects and advantages of our invention will be appreciated and understood in view of the following detailed description and accompanying drawings wherein:

FIG. 4 is a side elevation, partly in cross-section, of a modified form of the invention;

FIG. 5 is a cross-sectioned end view thereof taken on the line 5—5 of FIG. 4;

FIG. 6 is a partly broken away, partly sectioned side elevation of a modified street plate;

FIG. 7 is a cross-sectioned end view of the modified street plate taken on the line 7—7 of FIG. 6; and FIG. 8 is a plan view of the modified street plate.

Figure 1:
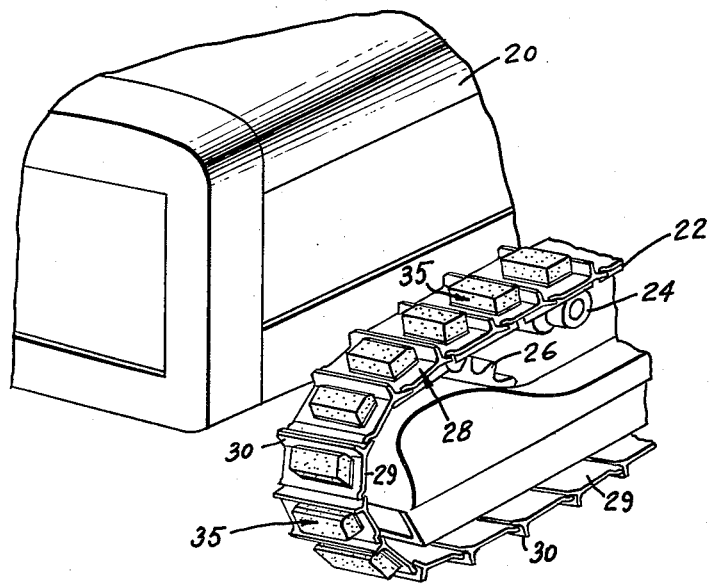
FIGURE 1 is a partial view in perspective of a tractor with part of one endless track.

With reference to FIG. 1, the body of the tractor is indicated by the character 20. Endless track 22 is supported on rollers 24 and is caused to move in either a forward propelling direction or in reverse thereof by sprocket wheel 26. The endless track 22 comprises a heavy link belt or chain (not shown) to which the usual grousers 28 are pivotally and relatively permanently attached. As shown, these grousers 28 are formed with a relatively flat planar plate 29 extending in the general plane of the track and a cleat or lug portion 30 extending outwardly therefrom. As also shown, the leading edge of each grouser may be formed to overlap the trailing edge of the grouser ahead of it so as to present a fairly unbroken surface when the track is passing over the sprocket wheel. Usually, these grousers are cast or forged into the shape shown so that cleat 30 is integrally formed with the flat plate 29.

As illustrated in FIGS. 2–7, inclusive, these grousers are supplied with a transverse row of belt holes 32 punched or drilled in the flat plate portion 29. Usually only two holes are supplied, but more may be furnished, depending on the width of the grouser. These holes are supplied for the purpose of bolting on the various street plates, extra cleats, or other traction units which may be procured. Reinforcements 33 for the holes 32 may be welded or otherwise suitably secured to the bottom surfaces of the grouser plate portions 29 where and as needed. As will be more fully described, these bolt holes 32 will be utilized in our invention.

Figure 2:
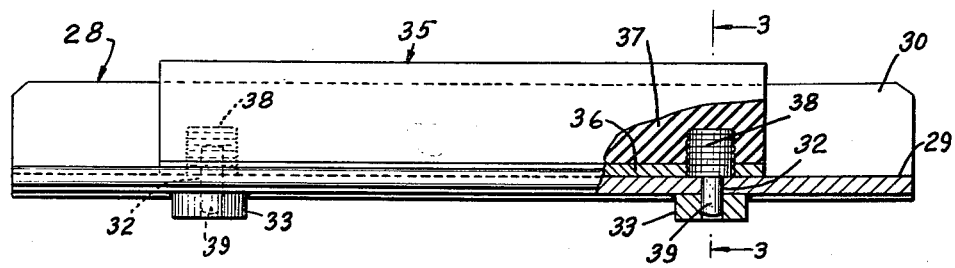
FIG. 2 is a side elevation, partly in cross-section, of our soft shoe as installed on a grouser.
Figure 3:
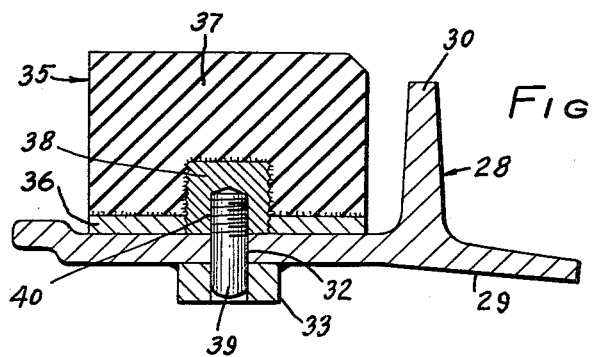
FIG. 3 is a cross-sectioned end elevation thereof taken on the line 3—3 of FIG. 2.

As shown in FIGS. 1, 2, and 3, the soft street shoe 35 comprises a flat steel plate 36, a body of elastic material 37, a pair of permanent magnets 38 and a pair of shear studs or pins 39. The elastic material in the body 37 may be of hard rubber, felt, plastic, plastic impregnated substances, rubber substitutes, synthetics, or even wood could be used when needed or desired. The permanent magnets 38 may be of any desired shape, cylindrical, square, or rectangular, but should be of high quality material having a maximum magnetic force per volume of material. These magnets should be force fitted or otherwise suitably secured in steel plate 36 so that their bottom faces are flush with the bottom of the steel plate 36 and so that contact between the magnet faces and the grouser is effected and insured. These magnets 38 are preferably supplied with roughened sides for maximum retention in the softer material embodied in shoe body 37. The latter may be cast or molded around the magnets protruding upwardly from the steel plate and is vulcanized or otherwise strongly adhesively secured to the upper surface of the steel plate 36 and to the magnets. It will be noted that the body 37 is of greater height than the cleat portion 30 on the grouser 28. Obviously, this is required either to protect the cleat on rough ground or to prevent its coming into contact with and marking the pavement or floor being traversed by the tractor.

The magnets 38 are formed with a threaded aperture 40 to accept the threaded steel studs 49. While other modes of securing the studs 39 into the magnets 38 could be accomplished, some of them might be more difficult of accomplishment due to the nature of the magnetic material used in the magnets. Generally, these maximum strength magnets are made from brittle refractory-like substances sintered and pressed to shape. Such construction does not have too much shear strength and could easily be ruptured by attempting to force a smooth stud into a molded or formed hole therein.

Again, the plate 36 could be made from the highly magnetic materials used in the magnets 38 but here also the nature of the material would militate against such use. The steel plate, as used, not only has sufficient magnetic permeability for the purpose intended but also possesses the maximum shear strength against those shearing forces developed in the studs or pins 39.

In use, the grouser plate is washed off with a hose, if necessary, the area around the holes is lightly wire brushed to effect a reasonably good contact between the grouser plate and the magnet faces, and the street shoe is placed thereon with the studs or pins 39 protruding through the grouser plate holes 32 and reinforcements 33. The magnetic lines of force spread outwardly in all directions and tend to become concentrated in the steel plate 36 and grouser flat plate 29. The magnetic cohesion holds the shoe in place on the grouser while, as indicated previously, the shear forces are taken by the pins 39 and the steel plate 36.

While two magnets 38 have been shown, it is to be understood that more magnets could be used where more holes are available in the grouser plate or one long magnet could be used with a plurality of pins protruding downwardly therefrom. Such latter arrangement, however, was found to be quite expensive and the increase in magnetism experienced did not warrant the considerable additional expense.

The street plate 45 shown in FIGS. 4 and 5 comprises the curved steel plate 46, a strip of elastic material 47, a pair of magnets 48 and their associated pins or studs 49. This street plate is shown installed on a grouser 28 with its flat plate portion 29, bolt holes 32, reinforcements 33, and cleat portion 30.

Curved steel plate 46 is formed with a flat generally horizontal portion 50 and a vertical or downwardly depending portion 52. Horizontal portion 50 rests on top of the cleat portion 30 and may be slightly downwardly curved, as shown, to retain it in place with relation to the grouser. Vertical portion 52 rests on the upper surface of grouser plate 29. The bottom of this vertical portion may be bent, as shown, to prevent cutting into the surface of plate 29 and also to locate the curved plate 46 with the bent portion in grouser plate 29.

The strip of elastic material 47, which may be similar to those described above in connection with the shoe body 37, is vulcanized or otherwise suitably adhesively secured to the underside of plate 46. Depending from this strip 47 are the magnets 48 and pins 49 which may be similar to those magnets 38 and pins 39 previously described. Thus the function of this elastic strip 47 is not only to support the magnets 48 from the plate 46 but to cushion the comparatively frail and brittle magnets against the compressive forces developed by the flexure of the horizontal portion 50 of the curved steel plate 46. The magnetic forces developed from the magnets through the grouser plate and cleat and the street plate curved portion 46 serve to hold the street plate in place against the centrifugal forces developed by the track going around the sprocket wheels while the shear and compressive forces are resisted by the grouser and the curved steel plate portion of the street plate. Again, a long thin magnet, contiguous in length to the elastic strip 47, could be used. The same disadvantages previously described, however, still obtain.

From the practical standpoint, the use and installation of this embodiment is the same as previously described with relation to the street shoe. In both cases, removal is accomplished by pulling or prying the shoe or plate upwardly until the pins are disengaged from the bolt holes in the grouser.

While the embodiments described above are new articles of manufacture, that shown in FIGS. 6–8, inclusive, is a modification applied to a standard street plate 55. This standard street plate is a generally hollow body extending upwardly from a generally planar base 56. This plate may be forged or cast from steel or other high strength ferrous materials. These plates have a horizontal portion 57, downwardly depending curved sides 59, and downwardly depending substantially vertical back and front walls 60, and base portion 61 having holes 62 for the reception of headed pins 63.

It will be noted that horizontal portion 57 terminates in a hook portion 58 which hooks over the upper edge of the grouser cleat 30. This arrangement, of course, keeps the street plate located with reference to the cleat and serves to protect the cleat from damage. The sides 59 curve inwardly toward the back 60 to make room for the holes 62 in the base portions 61.

The modification made by us is to supply the horseshoe magnet 65 which is suspended from the horizontal portion 57 of the standard street plate 55 so as to contact the grouser plate portion 29. The suspension is accomplished by headed screw 66 which passes through a hole 67 formed in the yoke of the horseshoe magnet and threadedly engages a threaded hole 68 in the street plate horizontal portion 57. A compression spring 70, surrounding screw 66, is interposed between the undersurface of the horizontal portion 57 and the yoke of the magnet. Obviously, the function of this spring is to take most of the compressive forces developed in the street plate 55 and thus protect the comparatively frail magnet.

The magnetic forces developed by the horseshoe magnet throughout the sides and other portions of the steel street plate and the grouser serve to hold the plate in place against centrifugal forces as previously described. Pins 63, which may be force fitted into street plate holes 62 take the shear stresses developed. The use and installation of this modification is, obviously, similar to that described in connection with the other forms shown above.

Having thus described certain preferred embodiments of our invention, we do not intend to be limited thereby as many modifications thereof may suggest themselves to those skilled in the art. It is intended that all such modifications shall be considered as falling within the spirit of our invention and the scope of the appended claims wherein we claim:

1. A street shoe for use with the endless tracks of a tractor where said endless tracks consist of a plurality of segmented track plates of paramagnetic materials, each of said track plates having a flat planar portion, a cleat portion extending normally outwardly from said planar portion for contacting the surface over which said tractor is being traversed, and a transverse row of bolt holes formed in said planar portion, each street shoe comprising:

a flat rectangular base of paramagnetic materials adapted to contact the outer surface of said track plate planar portion;

a plurality of studs secured to and depending downwardly from said base for insertion in said track plate bolt holes;

a rectangular body of resilient material secured to and extending upwardly from said base to a height greater than that of said track plate cleat portion; and magnetic fastening means embeddedly secured in said base and body, said magnetic means having a planar portion directly in contact with the flat planar portion of said track plate for securing said street shoe to said track plate.

2. A street shoe as claimed in claim 1 wherein said fastening means consist of a plurality of high permeability high magnetic strength permanent magnets secured into said base and said body so that a planar portion of each of said magnets will contact the upper surface of the track plate planar portion and wherein said body of resilient material constitutes a protective means for said magnets whereby said magnets are protected against the compressive forces established between the surface contacting face of said body and said track plate.

References Cited in the file of this patent

UNITED STATES PATENTS

| | | |
|---|---|---|
| 1,635,596 | White | July 12, 1927 |
| 2,922,933 | Mauer et al. | Jan. 26, 1960 |
| 2,967,737 | Moore | Jan. 10, 1961 |

FOREIGN PATENTS

| | | |
|---|---|---|
| 1,035,422 | France | Apr. 15, 1953 |